United States Patent Office 2,947,199
Patented Aug. 2, 1960

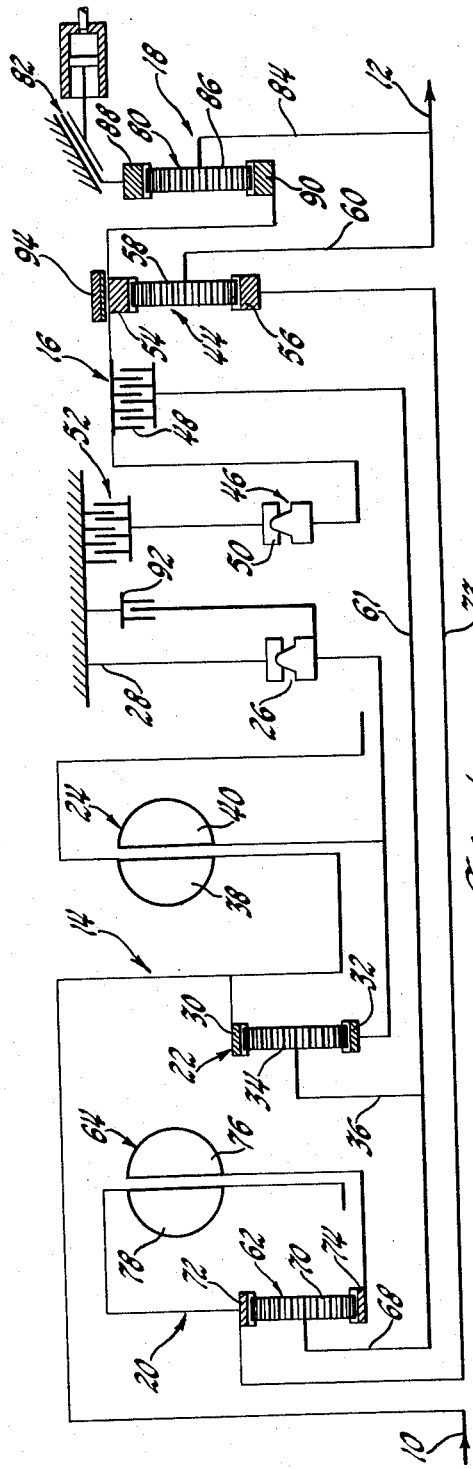

2,947,199

TRANSMISSION

Jack R. Doidge, Ann Arbor, and Victor C. Moore, Plymouth, Mich., assignors to General Motors Corporation, Detroit, Mich., a corporation of Delaware Filed Nov. 26, 1957, Ser. No. 698,997

9 Claims. (Cl. 74—688)

This invention relates to improvements in arrangements of automatic transmissions adapted, although not exclusively, for use with motor vehicles.

Because of the demand for lower vehicle body floor lines, the allotted space for transmissions have been considerably reduced. To accommodate the transmission, the floor of the body has been provided with a hump extending along the longitudinal axis of the vehicle which is very pronounced and interferes with passenger comfort. The hump is particularly objectionable in the vicinity of the engine where a hydrodynamic torque transmitting device, such as a torque converter or fluid coupling, is usually located. Efforts to decrease the lateral or vertical dimensions of the transmission, and hence reduce the hump, are complicated by the constant demand for more power. As is well known, the capacity of a particular torque transmitting unit is, in general, determined by the diametrical size. Therefore, increased power requires larger diameters and thus the vertical dimensions grow. In addition, attempts to decrease the size of the transmission present problems in the arrangement of the operating units and affect the operating efficiency of the transmission.

With these problems in mind, the invention contemplates a transmission wherein the units thereof are uniquely arranged so as to require a minimum of space, especially in a vertical direction, that has a minimum number of hydraulically operated ratio changing devices, that affords a plurality of forward speed ratios and a reverse drive, and that has split torque features for more efficient operation.

The invention also seeks to provide an arrangement whereby a hydrodynamic torque transmitting device for interconnecting the engine and the transmission transmits only a portion of the input torque and hence may be considerably reduced in size.

Specifically, a torque transmitting mechanism is afforded which has a torque dividing gear unit combined with a fluid coupling in a novel way so that the coupling may be over driven to increase the coupling capacity and also so that the fluid coupling is only required to transmit a portion of the input torque transferred by the mechanism.

In carrying out the invention, front and rear forward driving gear units and a reverse driving gear unit are interposed in the drive train between driving and driven shafts. Appropriate ratio changing devices are utilized to condition the gear units for either forward or reverse drive with a plurality of forward speed ratios being available in forward drive. Positioned in the drive train between the front and rear gear units is a torque transmitting mechanism which employs a torque dividing gear set and a fluid coupling for smooth and gradual vehicle starts. The mechanism is arranged so that the fluid coupling transfers only a portion of the torque transferred by the mechanism. In addition, the fluid coupling is overdriven initially to start vehicle movement and this fact, plus the necessity of only transmitting a portion of the delivered torque, permits the use of a fluid coupling considerably reduced in size.

The foregoing and other objects and advantages of the invention will be apparent from the following description and from the accompanying drawings in which:

Figure 1 illustrates schematically a transmission incorporating the principles of the invention; and Figure 2 is a graph depicting a typical fluid coupling capacity curve.

Referring to Figure 1, the numerals 10 and 12 designate, respectively, the driving and driven shafts for the transmission. Driving shaft 10 may be connected to a vehicle engine (not shown) while the driven shaft 12 may be drive associated with the vehicle wheels in a known manner. Interposed between the driving and driven shafts 10 and 12 are a front gear unit 14, rear gear unit 16, and reverse gear unit 18, which are interconnected, as will be explained, to furnish four forward speed drives and a reverse drive. A torque transmitting mechanism 20 is included in the drive train between the front and rear gear units 14 and 16, the purpose of which will become apparent from the following description.

Fluid pressure for operating the various hydraulically actuated ratio changing devices may be provided by appropriate pumps driven either by driving shaft 10 or the driven shaft 12. Also, a control system for distributing the pressure fluid for operating the various ratio changing devices in proper sequence can be afforded of suitable character as understood by those versed in the art.

The front planetary gear unit 14 has a planetary gear set 22 controlled both by a hydrodynamic torque transmitting device, such as fluid coupling 24, and a one-way device 26 to furnish two different speed ratios. The one-way device 26, which is grounded at 28, may be of known structure arranged to prevent relative rotation between two components in one direction and allow free relative rotation in an opposite direction. This one-way action may be obtained through a series of one-way elements such as sprags, rollers, or the like. Gear set 22 includes an input ring gear 30 rotatable with the driving shaft 10 and a reaction sun gear 32 prevented from reverse rotation by the one-way device 26. The gears 30 and 32 intermesh with the series of planet pinions 34 journaled on an output planet carrier 36. The fluid coupling 24 has the impeller 38 thereof connected to the input ring gear 30 and the turbine 40 thereof secured to the reaction sun gear 32.

When the coupling 24 is empty, the one-way device 26 is effective to prevent the reaction sun gear 32 from rotating backwards and, therefore, with the input ring gear 30 being driven forwards, the output planet carrier 36 will revolve at a reduced speed in the same forward sense. A substantially direct drive through the gear set 22 results when the coupling 24 is filled with fluid and the input ring gear 30 and the reaction sun gear 32 are clutched together. The one-way device 26, of course, will unlock and permit the forward rotation of the sun gear 32. There will be a slight difference in speeds between the input ring gear 30 and the output planet carrier 36 due to the inherent slippage within the fluid coupling 24.

The rear gear unit 16 is positioned rearwardly from the front unit 14 and has a planetary gear set 44, which is conditioned for two forward speed ratios by a one-way device 46, similar to one-way device 26, and a multi-disk type clutch 48. An outer race 50 for the one-way device 46 is grounded by a multi-disk neutral brake 52, the function of which will be explained in the operational summary. Planetary gear set 44 comprises a reaction ring gear 54, prevented from reverse rotation by the coaction of one-way device 46 and neutral brake 52, and an input sun gear 56, both of which gears intermesh with a series of planet pinions 58. Pinions 58 are revolvably supported on an output planet carrier 60, in turn, connected to the driven shaft 12. With the reaction ring gear 54 restrained from reverse rotation, the output planet carrier 60 will be rotated in the same forward direction as the driving input sun gear 56 but at a reduced speed. For a substantially direct drive ratio through the rear gear unit 16, the clutch 48 is engaged whereupon the rear unit ring gear 54 through an intermediate shaft 61 will be joined to the front unit planet carrier 36. With torque transmitting mechanism 20 operative, as will be apparent, the rear unit ring and sun gears 54 and 56, then, will be clutched together so that the gear set 44 is locked up.

The torque transmitting mechanism 20 is disposed in the drive train between the front and rear gear units 14 and 16 and provides a fluid start for the vehicle somewhat in the manner of a conventional fluid clutch or coupling. When the engine is idling, the mechanism 20 is incapable of transferring sufficient torque to the rear gear unit 16 to to rotate driven shaft 12 and, consequently, the vehicle will remain stationary. As engine speed increases the mechanism 20 will transfer more torque to the rear gear unit 16 until substantially all of the torque delivered by the front gear unit 14 is transferred thereby to furnish a smooth and gradual vehicle start.

Since it is desirable that such a mechanism utilize a fluid coupling or a similar slippable clutch device, the size of the coupling becomes an important consideration if the body floor line is to be lowered. This particular floor line problem is further complicated when the coupling is closely adjacent to the engine, although the same problem would exist if the coupling were located elsewhere in the transmission. To best demonstrate and explain the problem, reference is made to the following somewhat general Equation 1 for the torque capacity of a coupling, (1) $$T = cn^2 D^5$$

where T is the torque capacity of the coupling in lb.-ft.; c is a coefficient; n is the speed of the impeller rotation; and D, the diameter of the torus (the body of fluid in the coupling). Substitution of appropriate values in Equation 1 will produce a curve somewhat similar to that shown in the Figure 2 graph. If a fluid coupling is selected to transmit peak engine torque at some predetermined speed, e.g., 300 lb.-ft. at 2000 engine r.p.m., then it can be seen from Equation 1 that as the diameter of the coupling is decreased the speed of the impeller must be increased if the same torque is to be transmitted. But the smaller coupling will not transmit peak engine torque at the proper speed, namely, 2000 r.p.m., and therefore is not satisfactory.

To solve this problem the invention reduces the torque transferred through the smaller coupling and also increases the speed of the coupling. This is accomplished by the mechanism 20 which includes a torque dividing planetary gear set 62 and a relatively small fluid coupling 64. Gear set 62 has an input planet carrier 68 drive connected to the first gear input planet carrier 36 and has journaled thereon a series of planet pinions 70 intermeshing with a ring gear 72 connected by a main shaft 73 to the rear gear input sun gear 56 and a sun gear 74. Fluid coupling 64 has the impeller member 76 thereof joined to the sun gear 74 and the turbine member 78 thereof attached to the ring gear 72.

Assuming the coupling 64 is filled with fluid, then at stall, as when the vehicle is stationary, the ring gear 72 and accordingly the turbine member 78 will be stationary and as can be seen the pump member 76 will be overdriven, i.e., driven at a speed faster than the input planet carrier 68. Furthermore, the coupling 64 will only transfer a portion of the input torque delivered to the planet carrier 68. This is verified by the following equations;

(2) $$\text{Speed ratio} = 1 + \frac{N_r}{N_s}$$

and (3) Torque transmitted by fluid coupling $$= \frac{N_s}{N_s + N_r} \times \text{input torque}$$

where $N_s$ and $N_r$ are, respectively, the number of teeth on the sun and ring gears 74 and 72. If it is assumed that the ring gear 72 has 60 teeth and the sun gear 74, 40 teeth, upon substitution in the Equations 2 and 3 gear set 62 has a speed ratio of 2.5 which means at stall the coupling pump member 76 will be driven 2½ times faster than the input planet carrier 68. In other words, when the planet carrier 68 revolves once the sun gear 74 and the pump member 76 will revolve 2½ revolutions. Also, the torque transmitted by the coupling 64 will be 40% of the input torque delivered by the front gear unit 14 to the carrier 68, this coupling torque being that necessary to prevent relative rotation between the ring and sun gears 72 and 74. In effect, the gear set 62 functions as a torque divider for the coupling 64. Part of the torque proceeds through the coupling 64 and then to ring gear 72 while another portion of the torque is transferred directly to the ring gear 72. At the ring gear 72 the two torque portions are re-combined and then transferred to the main shaft 73. Hence, the mechanism 20 transmits substantially all of the delivered torque except for that lost due to inherent slippage through coupling 64.

Referring back to Equation 1 it can be now seen that the coupling impeller speed has been increased while the torque burden has been reduced. Therefore, the diameter can be made smaller to satisfy the equation. Still assuming that 300 lb.-ft. is being delivered to the mechanism 20 at 2000 r.p.m. and that the gear set 62 has the above assigned tooth numbers the torque that the coupling 64 will be required to transmit is only 120 lb.-ft. Moreover, at stall the coupling impeller 76 will be driven at a speed of 5000 r.p.m. Also, noteworthy is the fact that the planet carrier 68 is driven slower than the driving shaft 10 when the front gear is in reduction lessening the possibility of vehicle creep.

The reverse gear unit 18 positioned at the rearmost part of the transmission includes a planetary gear set 80 and a cone type reaction brake 82. A planet carrier 84 for the gear set 80 is joined to the driven shaft 12 and has journaled thereon a series of planet pinions 86 intermeshing with a reaction ring gear 88 and an input sun gear 90 connected to the rear gear unit reaction ring gear 54. This gear set 80 combines with the rear gear unit set 44 to rotate the driven shaft backwards in the following manner. The rear gear unit reaction ring gear 54 is freed from restraint in either direction by disengaging neutral brake 52 and the reverse unit reaction ring gear 88 is maintained stationary by the cone brake 82. With the rear unit sun gear 56 being driven forwards the reaction ring gear 54, without restraint, will be rotated backwards and carry therewith the reverse unit sun gear 90. Consequently, the reverse unit planet carrier 84 will be driven backwards at a reduced speed and drive the driven shaft 12.

As described, the front and rear gear unit one-way devices 26 and 46 prevent their respective reaction gears from rotating backwards when the driving shaft 10 is producing the drive. However, when the driven shaft 12 becomes the driver, e.g., at coast, the reaction gears will be allowed to rotate forwards without restraint from the one-way devices 26 and 46. Since neither the front nor rear gear units 14 and 16 under these conditions has a reaction gear, as such, the drive connection between the driving shaft 10 and the driven shaft 12 is interrupted and the engine cannot be used as a brake to assist in slowing down the vehicle. Consequently, the front gear unit 14 is provided with an overrun brake 92 and the rear gear unit 16 an overrun brake in the form of a band 94. Preferably, both of the brakes 92 and 94 are engaged in the first two forward speed ratios thus preventing rotation of the front and rear gear unit reaction gears 32 and 54 in either direction. When the driven shaft 12 becomes the driving source, the output gears 30 and 56 for the front and rear gear units 14 and 16 are overdriven. The front gear unit output gear 30 attempts to overdrive the engine so that that maximum engine resistance and consequently more engine braking is obtained.

The operation of the transmission is as follows. For Neutral, brakes 92, 52, 94 and 82 and clutch 48 are all disengaged. In addition, the front gear unit coupling 24 is emptied while the torque transmitting mechanism coupling 64 is maintained full. The function of the neutral brake 52 is now apparent. Since the front gear unit 14 is provided with reaction due to the restraint of the sun gear 32, drive will be transferred from the front gear unit 14 through the torque transmitting mechanism 20 to the rear gear unit input sun gear 56. If the rear gear unit reaction ring gear 54 was restrained from backward rotation in the same way as the front gear unit 72, drive would be transferred by the rear gear unit 16 to the driven shaft 12 and the vehicle would probably creep even though the engine was idling. To insure that the rear gear unit 16 does not have reaction, the neutral brake 52 is disengaged and the reaction ring gear 54 can rotate freely. As a result, drive cannot be transmitted by the rear gear unit 16.

For first speed the neutral brake 52 is engaged to render the rear gear unit 16 operative as a reduction drive unit. With the engine idling and the vehicle stationary, the front gear unit planet carrier 36 will be rotated, as mentioned, at a reduced speed and carries therewith the planet carrier 68 for the torque transmitting mechanism 20. Since the vehicle is stationary, the mechanism ring gear 72 and coupling turbine 78 will be stationary while the sun gear 74 and coupling impeller 76 are overdriven. By design, the coupling 64 is incapable of transmitting at engine idle speeds sufficient torque to start rotation of the ring gear 72. However, as the engine speed is increased the speed of the impeller 76 will be likewise increased and the capacity of the coupling 64 will progressively build up until the impeller 76 and turbine 78 are revolving at nearly the same speed with a slight difference being due to slippage. Hence, the sun and ring gears 74 and 72 will be clutched together and the gear set 62 locked up for unitary drive. As mentioned, the torque transmitted by the coupling 64 is that necessary to prevent relative rotation between the ring and sun gears 72 and 74. Drive from the mechanism 20 is then transferred by main shaft 73 to the rear unit input sun gear 56 whereupon the rear unit planet carrier 60 and the driven shaft 12 will be driven at a further reduced speed determined by the reduction ratios of both front and rear gear units 14 and 16. Also, until the torque transmitting mechanism gear set 62 is locked up there will be a reduction in speed through the mechanism 20. The transmission is now conditioned for first speed drive.

In second speed the front unit coupling 24 is filled to prepare the front gear unit 14 for a substantially direct drive. At this time the front unit overrun brake 90 is necessarily disengaged so that the reaction sun gear 32 can rotate forwardly. Drive will be transferred from the driving shaft 10 through the front gear unit 14, torque transmitting mechanism 20 to the rear gear unit 16. The driven shaft 12 will be driven at a reduced speed determined by the gear unit 16 assuming that the torque transmitting mechanism gear set 62 is substantially locked up.

For third speed, the front unit coupling 24 is emptied and the rear unit clutch 48 is engaged. When the clutch 48 is engaged, the rear unit ring and sun gears 54 and 56 are clutched together, as previously described, through the torque transmitting mechanism 20 so that the rear gear unit 16 is locked up for what approximates a direct drive. Again, slippage in the mechanism coupling 64 will cause a slight difference in speeds. Drive from the driving shaft 10 is transferred by the front gear unit 14 at a reduced speed at which point the torque is split, part goes directly to the rear gear unit 16 through the clutch 48 and the other part through the mechanism 20 to the rear gear unit sun gear 56. By this split of torque, the part going to the rear gear unit ring gear 54 may be considered wholly mechanical while that proceeding through the torque transmitting mechanism 20 is hydraulic and is subject to the fluid losses in the mechanism coupling 64. This split torque feature will, as a result, produce a more efficient third speed at a ratio determined by the front gear unit 14.

In fourth speed, the front unit coupling 24 is filled so that both the front gear unit 14 and the rear gear unit 16 afford substantially direct drive ratios. Consequently, the driven shaft 12, will be driven at nearly the same speed as the driving shaft 10. The split torque feature described relative to third speed is still effective in fourth speed.

To establish Reverse, the neutral brake 52 and the rear unit clutch 48 are disengaged and the front unit coupling 24 is emptied. The rear unit overrun brake 94 is necessarily disengaged since the rear unit reaction ring gear 54 must be free from restraint in either direction. Drive will be transferred by the driving shaft 10 through the front gear unit 14 and at a reduced speed through torque transmitting mechanism 20 to the rear unit sun gear 56. As previously described, the rear unit ring gear 54 and the reverse unit sun gear 90 will be revolved backwards, as will the reverse unit planet carrier 84 and driven shaft 12. The speed at which the driven shaft 12 is driven backwards will be determined by the reduced drive ratio from the front gear unit 14 and the combined ratios obtained from the rear and reverse gear units 16 and 18.

From the foregoing, it can be seen that a fluid drive is provided by the torque transmitting mechanism 20 necessary for smooth and gradual starts and that the mechanism 20 has been considerably reduced in size to accommodate a lower vehicle body floor line. Similarly, the various gear units have been spaced and interconnected so as to require a minimum number of hydraulic actuated ratio changing devices and obtain efficient operation.

The invention is to be limited only by the following claims.

We claim:

1. In a transmission driven by a torque producing engine, the combination of driving and driven shafts, planetary gearing for providing a plurality of speed ratios through the transmission comprising first and second planetary gear units each including an input gear, a reaction gear, and an output planet carrier having journaled thereon a plurality of planet pinions intermeshing with the input and reaction gears, the first gear unit having the input gear thereof rotatable by the driving shaft, the second gear unit having the output planet carrier drive rotatable with the driven shaft, clutch means for each of the first and second gear units operative to provide a substantially direct drive ratio through each of the respective first and second gear units, the clutch means including a first hydrodynamic torque transmitting device for the first gear unit, brake means for each of the first and second gear unit reaction gears to prevent rotation thereof in one direction and to provide another drive ratio through each of the respective first and second gear units, the first hydrodynamic device being effective to produce the substantially direct drive ratio through the first gear unit and being ineffective when said another drive ratio through the first gear unit is established, and a torque transmitting mechanism interposed between the first and second gear units for transferring drive therebetween, the torque transmitting mechanism comprising a torque control gear unit having an input element rotatable by the first gear unit output element and an output element rotatable with the second gear unit input element, and a second hydrodynamic torque transmitting device for automatically varying the relative speeds between the torque control gear unit input and output elements so as to control the torque transferred therethrough, the difference in speeds between the torque control gear unit input and output elements being greatest at engine idling speeds so that insufficient torque is transferred by the mechanism to rotate the driven shaft.

2. In a transmission driven by a torque producing engine, the combination of driving and driven shafts, planetary gearing for providing a plurality of speed ratios through the transmission comprising first and second planetary gear units each including an input gear, a reaction gear, and an output planet carrier having journaled thereon a plurality of planet pinions intermeshing with the input and reaction gear elements, the first gear unit having the input gear thereof rotatable by the driving shaft, the second gear unit having the output planet carrier drive connected to the driven shaft, clutch means for each of the first and second gear units operative to provide a substantially direct drive ratio through each of the respective first and second gear units, the clutch means including a controlled fluid coupling for the first gear unit, brake means for each of the first and second gear unit reaction gears to prevent rotation thereof in one direction and to provide another drive ratio through each of the respective first and second gear units, the controlled fluid coupling when filled with fluid producing a substantially direct drive ratio through the first gear unit and when emptied permitting said another drive ratio to be established, and a torque transmitting mechanism interposed between the first and second gear units for transferring drive therebetween, the torque transmitting mechanism comprising a fluid coupling including pump and turbine members, and a torque control gear unit having an output gear element interconnected between the second gear unit input element and the coupling turbine member, another gear element connected to the coupling pump member, and an input planet carrier rotatable by the first gear unit output element, the input planet carrier having a plurality of planet pinions journaled thereon intermeshing with gear elements, the fluid coupling varying the torque transferred through the mechanism so that at engine idling speeds insufficient torque is transferred to rotate the drive shaft.

3. In a transmission driven by a torque producing engine, the combination of driving and driven shafts, planetary gearing for providing a plurality of speed ratios through the transmission including first and second planetary gear units, the first gear unit having an input gear rotatable by the driving shaft, a reaction gear, and an output planet carrier having journaled thereon a plurality of planet pinions intermeshing with the input and reaction gears, a controlled fluid coupling having an impeller connected to the first gear unit input gear and a turbine connected to the first gear unit reaction gear, the controlled coupling, when filled with fluid, clutching together the first gear unit input and reaction gears to provide a substantially direct drive through the first gear unit, a one-way device for preventing rotation of the first gear unit reaction gear in one direction, when the controlled coupling is empty, to afford another drive ratio through the first gear unit, the second gear unit having an input gear, a reaction gear and an output planet carrier rotatable with the driven shaft and having journaled thereon a plurality of planet pinions intermeshing with the input and reaction gears, a clutch, when operative, for connecting the first gear unit planet carrier and the second gear unit reaction gear together to provide one drive ratio through the second gear unit and a split torque drive between the first and second gear units, another one-way device for preventing rotation of the second gear unit reaction gear in one direction, when the clutch is inoperative, to provide another drive ratio through the second gear unit, and a torque transmitting mechanism interposed between the first and second gear units for transferring drive therebetween, the torque transmitting mechanism comprising a torque control gear unit having a plurality of elements including an input element rotatable by the first gear unit output planet carrier and an output element rotatable with the second gear unit input gear, and a fluid coupling having a pump member connected to one of the elements and a turbine member connected to another of the elements, the mechanism fluid coupling varying the torque transferred by the torque control gear unit so that at engine idling speeds insufficient torque is transferred by the mechanism to rotate the driven shaft.

4. In a transmission driven by a torque producing engine, the combination of driving and driven shafts, planetary gearing for providing a plurality of speed ratios through the transmission, the planetary gearing comprising first and second gear units, the first gear unit having an input ring gear rotatable by the driving shaft, a reaction sun gear, and an output planet carrier having journaled thereon a plurality of planet pinions intermeshing with the sun and ring gears, a controlled fluid coupling having an impeller connected to the first gear unit ring gear and a turbine connected to the first gear unit sun gear, the controlled coupling, when filled with fluid, clutching together the first gear unit ring and sun gears to provide a substantially direct drive through the first gear unit, a one-way device for preventing rotation of the reaction sun gear in one direction, when the controlled coupling is empty, to afford another drive ratio through the first gear unit, the second gear unit having an input sun gear, a reaction ring gear and an output planet carrier rotatable with the driven shaft and having journaled thereon a plurality of planet pinions intermeshing with the sun and ring gears, a clutch, when operative, for connecting the first gear unit planet carrier and the second gear unit reaction ring gear together to provide one drive ratio through the second gear unit and a split torque drive between the first and second gear units, another one-way device for preventing rotation of the second gear unit reaction ring gear in one direction, when the clutch is inoperative, to provide another drive ratio through the second gear unit, and a torque transmitting mechanism interposed between the first and second gear unit for transferring drive therebetween, the torque transmitting mechanism comprising a fluid coupling including pump and turbine members, and a torque control gear unit having an output gear interconnected between the second gear unit input sun gear and the coupling turbine member, another gear connected to the coupling pump member, and an input planet carrier rotatable by the first gear unit output planet carrier, the control gear unit input planet carrier having a plurality of planet pinions journaled thereon intermeshing with the control gear unit sun and ring gears, the mechanism fluid coupling varying the torque transferred through the mechanism so that at engine idling speeds insufficient torque is transferred thereby to rotate the driven shaft.

5. In a transmission driven by a torque producing engine, the combination of driving and driven shafts, planetary gearing comprising first and second planetary gear units each including input, output, and reaction elements, the first gear unit having the input element thereof rotatable by the driving shaft, the second gear unit having the output element thereof connected to the driven shaft, ratio changing devices for so conditioning the planetary gearing as to provide a plurality of speed ratios therethrough, the ratio changing devices including a forward drive brake cooperating with one of the gear units, the forward drive brake being engageable in forward drive so as to establish plural forward speed ratios through said one of the gear units and releasable in neutral so as to establish a neutral condition for the transmission, a torque transmitting mechanism drive related to the first and second gear units for transferring drive therebetween, the torque transmitting mechanism comprising a torque control gear unit having an input element rotatable by the first gear unit output element and an output element rotatable with the second gear unit input element, and a hydrodynamic torque transmitting device for automatically varying the relative speeds between the torque control gear unit input and output elements so as to control the torque transferred therethrough, the difference in speeds between the torque control gear unit input and output elements being greatest at engine idle so that insufficient torque is transferred by the mechanism to rotate the driven shaft.

6. In a transmission driven by a torque producing engine, the combination of driving and driven shafts, planetary gearing comprising first and second planetary gear units each including input, output, and reaction elements, the first gear unit having the input element thereof rotatable by the driving shaft, the second gear unit having the output element thereof rotatable with the driven shaft, ratio changing devices for so conditioning the planetary gearing so as to provide a plurality of speed ratios therethrough, the ratio changing devices including a one-way mechanism for preventing rotation of the first gear unit reaction element in one direction so as to afford one forward drive speed ratio therethrough, a forward brake engageable during forward drive and releaseable in neutral so as to establish a neutral condition for the transmission and prevent drive in either direction therethrough, and another one-way mechanism coacting with the forward brake both to prevent rotation of the second gear unit reaction element in one direction so as to afford one forward drive speed ratio therethrough and to allow rotation of the second gear unit reaction element in an opposite direction so as to permit establishment of another forward drive speed ratio therethrough, overrun brake means coacting with both the first and second gear unit reaction elements so as to prevent rotation thereof in either direction and render the respective first and second gear units effective to transfer drive both in forward drive and coast drive directions, and a torque transmitting mechanism drive related to the first and second gear units for transferring drive therebetween, the torque transmitting mechanism comprising a torque control gear unit having a plurality of elements including an input element rotatable by the first gear unit output element and an output element rotatable with the second gear unit input element and a fluid coupling having a pump member connected to one of the elements and a turbine member connected to another of the elements, the fluid coupling varying the torque transferred by the torque control gear unit so that at engine idling speeds insufficient torque is transferred by the mechanism to rotate the driven shaft, the torque load on the fluid coupling being only a portion of that transferred by the mechanism.

7. In a transmission driven by a torque producing engine, the combination of driving and driven shafts, planetary gearing comprising first and second planetary gear units each including input, output, and reaction elements, the first gear unit having the input element thereof rotatable by the driving shaft, the second gear unit having the output element thereof rotatable with the driven shaft, ratio changing devices for so conditioning the planetary gearing as to provide a plurality of speed ratios therethrough, the ratio changing devices including a controlled fluid coupling coacting with one of the gear units to provide when filled with fluid a substantially direct drive ratio therethrough and when emptied permitting another drive ratio to be established therethrough, and a torque transmitting mechanism drive related to the first and second gear units for transferring drive therebetween, the torque transmitting mechanism comprising a fluid coupling including pump and turbine members and a torque control gear unit having an output gear element interconnected between the second gear unit input element and the coupling turbine member, another gear element connected to the coupling pump member, and an input planet carrier rotatable with the first gear unit output element, the input planet carrier having a plurality of planet pinions journaled thereon intermeshing with the gear elements, the fluid coupling varying the torque transferred through the mechanism so that at engine idling speeds insufficient torque is transferred thereby to rotate the driven shaft.

8. In a transmission driven by a torque producing engine, the combination of driving and driven shafts, planetary gearing comprising first and second planetary gear units each including input, output, and reaction elements, the first gear unit having the input element thereof rotatable by the driving shaft, the second gear unit having the output element thereof rotatable with the driven shaft, ratio changing devices for so conditioning the planetary gearing as to provide a plurality of speed ratios therethrough, the ratio changing devices including one-way mechanisms for preventing rotation of the first and second gear unit reaction elements in one direction so as to afford one forward drive speed ratio through the respective gear unit, a forward brake engageable during forward drive and releasable in neutral so as to establish a neutral condition for the transmisison and prevent drive in either direction therethrough, the forward brake also coacting with one of the one-way mechanisms for one of the gear units both to prevent rotation of the reaction element for said one of the gear units in one direction thereby affording said one forward drive speed ratio and to allow rotation of the reaction element for said one of the gear units in an opposite direction so as to permit establishment of another forward drive speed ratio therethrough, and a controlled fluid coupling operative when filled to establish a substantially direct drive ratio through the other of the gear units and when emptied to permit establishment of another drive ratio through said other of the gear units, overrun brake means coacting with both the first and second gear unit reaction elements so as to prevent rotation thereof in either direction and render the respective gear units effective to transfer drive both in a forward drive and a coast drive direction, and a torque transmitting mechanism drive related to the first and second gear units for transferring drive therebetween, the torque transmitting mechanism comprising a fluid coupling including pump and turbine members and a torque control gear unit having a ring gear interconnected between the second gear unit input element and the coupling turbine member, a sun gear connected to the pump member, and a planet carrier rotatable with the first gear unit output element, the input planet carrier having a plurality of planet pinions journaled thereon intermeshing with the sun and ring gears, the fluid coupling varying the torque transferred through the mechanism so that at engine idling speeds insufficient torque is transferred to rotate the driven shaft.

9. In a transmission driven by a torque producing engine, the combination of driving and driven shafts, planetary gearing for providing a plurality of speed ratios through the transmission comprising first and second planetary gear units each including an input gear, a reaction gear, and an output planet carrier having journaled thereon a plurality of planet pinions intermeshing with the input and reaction gears, the first gear unit having the input gear thereof rotatable by the driving shaft, the second gear unit having the output planet carrier rotatable with the driven shaft, clutch means for each of the first and second gear units operative to provide a substantially direct drive ratio through the respective gear units, brake means for each of the first and second gear unit reaction gears to prevent rotation thereof in one direction and to provide another drive ratio through the respective gear units, brake means comprising one-way mechanisms for each of the first and second gear unit reaction gears and a forward brake engageable during forward drive and releaseable in neutral so as to establish a neutral condition for the transmission and prevent drive in either direction therethrough, the forward brake coacting with one of the gear unit one-way mechanisms both to prevent rotation of said one gear unit reaction gear in one direction so as to afford said another drive ratio therethrough and to allow rotation of the said one gear unit reaction gear in an opposite direction so as to permit establishment of said substantially direct drive ratio therethrough by the clutch means, and a torque transmitting mechanism drive related to the first and second gear units for transferring drive therebetween, the torque transmitting mechanism comprising a torque control gear unit having an input element rotatable by the first gear unit output element and an output element rotatable with the second gear unit input element and a hydrodynamic torque transmitting device for automatically varying the relative speeds between the torque control gear unit input and output elements so as to control the torque transferred therethrough, the difference in speeds between the torque control gear unit input and output elements being greatest at engine idling speeds so that insufficient torque is transferred by the mechanism to rotate the driven shaft.

References Cited in the file of this patent
UNITED STATES PATENTS

| | | |
|---|---|---|
| 2,147,528 | Fottinger | Feb. 14, 1939 |
| 2,242,276 | Vincent | May 20, 1941 |
| 2,361,105 | Jandasek | Oct. 24, 1944 |
| 2,390,645 | Frank | Dec. 11, 1945 |
| 2,399,319 | Bowen et al. | Apr. 30, 1946 |
| 2,704,468 | Horton | Mar. 22, 1955 |
| 2,792,722 | Stefan | May 21, 1957 |

UNITED STATES PATENT OFFICE

CERTIFICATE OF CORRECTION

Patent No. 2,947,199                      August 2, 1960

Jack R. Doidge et al.

It is hereby certified that error appears in the printed specification of the above numbered patent requiring correction and that the said Letters Patent should read as corrected below.

Column 5, line 11, strike out "that", second occurrence; column 7, line 53, for "drive" read -- driven --.

Signed and sealed this 4th day of April 1961.

(SEAL)
Attest: ERNEST W. SWIDER

Attesting Officer

ARTHUR W. CROCKER
Acting Commissioner of Patents